(12) United States Patent
Artzi et al.

(10) Patent No.: US 8,903,702 B2
(45) Date of Patent: Dec. 2, 2014

(54) GENERATING SPECIFICATIONS FOR EXPRESSION LANGUAGE EXPRESSIONS AND TAG LIBRARIES

(75) Inventors: Shay Artzi, Brookline, MA (US); Manu Sridharan, Boulder, CO (US)

(73) Assignee: International Business Machines Corporation, Armonk, NY (US)

( * ) Notice: Subject to any disclaimer, the term of this patent is extended or adjusted under 35 U.S.C. 154(b) by 202 days.

(21) Appl. No.: 13/222,612

(22) Filed: Aug. 31, 2011

(65) Prior Publication Data

US 2013/0054221 A1 Feb. 28, 2013

(51) Int. Cl.
*G06F 9/45* (2006.01)
*G06F 9/44* (2006.01)
*G06F 17/30* (2006.01)

(52) U.S. Cl.
CPC . *G06F 17/30* (2013.01); *G06F 8/75* (2013.01)
USPC .......................................................... 703/22

(58) Field of Classification Search
CPC . G06F 8/75; G06F 9/45508; G06F 17/30893; G06F 11/3664; G06F 9/443; G06F 9/541; G06F 17/2725; G06F 17/2247; G06F 11/3688
USPC .................. 703/2, 3, 22; 717/136, 158, 171; 715/501, 513
See application file for complete search history.

(56) References Cited

U.S. PATENT DOCUMENTS

| | | | |
|---|---|---|---|
| 7,127,713 B2 * | 10/2006 | Davis et al. | 717/177 |
| 7,207,065 B2 | 4/2007 | Chess et al. | |
| 7,367,014 B2 | 4/2008 | Griffin | |
| 7,401,325 B2 * | 7/2008 | Backhouse et al. | 717/136 |
| 8,201,153 B2 * | 6/2012 | Backhouse et al. | 717/136 |
| 2003/0041288 A1 * | 2/2003 | Kolawa et al. | 714/38 |
| 2003/0226107 A1 * | 12/2003 | Pelegri-Llopart et al. | 715/513 |
| 2005/0015752 A1 | 1/2005 | Alpern et al. | |
| 2005/0262487 A1 | 11/2005 | Pistoia et al. | |
| 2007/0143748 A1 * | 6/2007 | Hennessy | 717/171 |
| 2007/0240140 A1 * | 10/2007 | Degenaro et al. | 717/158 |
| 2008/0270992 A1 | 10/2008 | Georgieva et al. | |
| 2008/0313619 A1 * | 12/2008 | Backhouse et al. | 717/136 |
| 2009/0178031 A1 * | 7/2009 | Zhao | 717/143 |

OTHER PUBLICATIONS

Chung et al. ("Expression Language Specification Version 2.1", 2006, Sun Microsystems, Inc., pp. 1-108).*

(Continued)

*Primary Examiner* — Omar Fernandez Rivas
*Assistant Examiner* — Iftekhar Khan
(74) *Attorney, Agent, or Firm* — Thomas Grzesik; Fleit Gibbons Gutman Bongini & Bianco PL

(57) ABSTRACT

Systems and methods are provided for creating a data structure associated with a software application that is based on at least one framework. According to the method, at least one Java Server Page file associated with the software application is analyzed. The Java Server Page (JSP) file includes at least one call to at least one library tag, and at least one Expression Language (EL) expression. A set of tag library usage information for the JSP file is generated based. The set of tag library usage information includes at least one variable, and a value of the at least one variable created by the at least one call. The EL expression is evaluated based on the variable and the value of the variable. A data structure is created for a static analysis engine based on EL expression. The data structure includes at least one Java expression representing the EL expression.

14 Claims, 11 Drawing Sheets

(56) References Cited

OTHER PUBLICATIONS http://www.crazysquirrel.com/computing/java/jsp/jstl-forEach.jspx, Smith, G., et al., "JSP Standard Tag Library (JSTL) c: forEach Tag", Apr. 12, 2011.

http://en.wikipedia.org/wiki/Reaching_definition, "Reaching Definition"—Wikipedia, The Free Encyclopedia, Apr. 12, 2011.

http://java.sun.com/products/jsp/tutorial/TagLibrariesTOC.html, "Tag Libraries Tutorial," (v. 1.0), revised: Jul. 25, 2000.

http://www.oracle.com/technetwork/java/index-jsp-135995.html, JavaServer Pages Standard Tag Library, Oracle, Apr. 12, 2011.

http://download.oracle.com/javaee/1.4/tutorial/doc.JSPIntro7.html, "The J2EE 1.4 Tutorial," Expression Language, Apr. 12, 2011.

* cited by examiner

TagLibDefInfo:

4: "person" -> ${people.people}.iterator().next()
5: "person" -> ${people.people}.iterator().next()
6: "person" -> ${people.people}.iterator().next()
7: "person" -> ${people.people}.iterator().next()
8: "person" -> ${people.people}.iterator().next()

FIG. 4

```
class ExampleServlet extends HttpServlet {
    protected void doGet(HttpServletRequest request,
            HttpServletResponse response) {
        Collection peopleCollection = new ArrayList();
        Person p = new Person();
        p.setAge(request.getParameter("age"));
        p.setName(request.getParameter("name"));
        p.setHeight(request.getParameter("height"));
        peopleCollection.add(p);
        PeopleBean peopleBean = new PeopleBean();
        peopleBean.setPeople(peopleCollection);
        request.setAttribute("people",peopleBean);
        ...
    }
}
```

GENERATING SPECIFICATIONS FOR EXPRESSION LANGUAGE EXPRESSIONS AND TAG LIBRARIES

FIELD OF THE INVENTION

The present invention generally relates to client-server applications, and more particularly relates to specification generation for client-server applications.

BACKGROUND OF THE INVENTION

Many modern web applications are implemented using the Java Enterprise Edition (JavaEE) platform. These types of web applications often make use of Expression Language (EL) expressions and tag libraries when presenting content via Java Server Pages (JSPs). This use of EL expressions and tag libraries makes traditional static analysis of such applications generally ineffective. For example, EL expression evaluation and tag libraries are often implemented using Java reflection and complex string manipulation, both of which cause significant difficulties for conventional static analysis engines. One key difficulty is that the execution of certain tag library calls can bind new names, which are then accessed by later EL expressions. This name-binding behavior of a tag library cannot easily be determined by analyzing its implementation.

SUMMARY OF THE INVENTION

In one embodiment, a method for creating a data structure associated with a software application that is based on at least one framework is disclosed. The method comprises analyzing, by a framework application modeler, at least one Java Server Page file associated with the software application. The Java Server Page file comprises at least one call to at least one library tag, and at least one Expression Language (EL) expression. A set of tag library usage information for the Java Server Page file is generated based on the analyzing. The set of tag library usage information comprises at least one variable, and a value of the at least one variable created by the at least one call. The at least one EL expression is evaluated based on the variable and the value of the variable that have been determined. A data structure is created for a static analysis engine based on the at least one EL expression that has been evaluated. The data structure includes at least one Java expression representing the at least one EL expression.

Another embodiment, an information processing system for creating a data structure associated with a software application that is based on at least one framework is disclosed. The information processing system comprises a memory and a processor communicatively coupled to the processor. A framework application modeler is communicatively coupled to the memory and the processor. The framework application modeler is configured to perform a method. The method comprises analyzing, by a framework application modeler, at least one Java Server Page file associated with the software application. The Java Server Page file comprises at least one call to at least one library tag, and at least one Expression Language (EL) expression. A set of tag library usage information for the Java Server Page file is generated based on the analyzing. The set of tag library usage information comprises at least one variable, and a value of the at least one variable created by the at least one call. The at least one EL expression is evaluated based on the variable and the value of the variable that have been determined. A data structure is created for a static analysis engine based on the at least one EL expression that has been evaluated. The data structure includes at least one Java expression representing the at least one EL expression.

A further embodiment provides a non-transitory machine readable medium encoded with a program for creating a data structure associated with a software application that is based on at least one framework. The program comprises instructions for analyzing, by a framework application modeler, at least one Java Server Page file associated with the software application. The Java Server Page file comprises at least one call to at least one library tag, and at least one Expression Language (EL) expression. A set of tag library usage information for the Java Server Page file is generated based on the analyzing. The set of tag library usage information comprises at least one variable, and a value of the at least one variable created by the at least one call. The at least one EL expression is evaluated based on the variable and the value of the variable that have been determined. A data structure is created for a static analysis engine based on the at least one EL expression that has been evaluated. The data structure includes at least one Java expression representing the at least one EL expression.

Other objects, features, and advantages of the present invention will become apparent from the following detailed description. It should be understood, however, that the detailed description and specific examples, while indicating various embodiments of the present invention, are given by way of illustration only and various modifications may naturally be performed without deviating from the present invention.

BRIEF DESCRIPTION OF THE DRAWINGS

FIG. 4 shows exemplary tag library definition/usage information resulting from a tag library analysis process in accordance with one embodiment of the present invention;

FIG. 6 illustrates an exemplary servlet class for the JSP file of FIG. 3 in accordance with one embodiment of the present invention;

DETAILED DESCRIPTION

Various embodiments of the present invention will be discussed in detail hereinbelow with reference to the attached drawings.

Embodiments of the present invention generate framework application models/specifications for a web application, and these models/specifications describe the Expression Language (EL) expression and tag library usage of the web application. Thus, web applications having EL expressions and tag libraries can be analyzed by static analysis engines.

Figure 1:
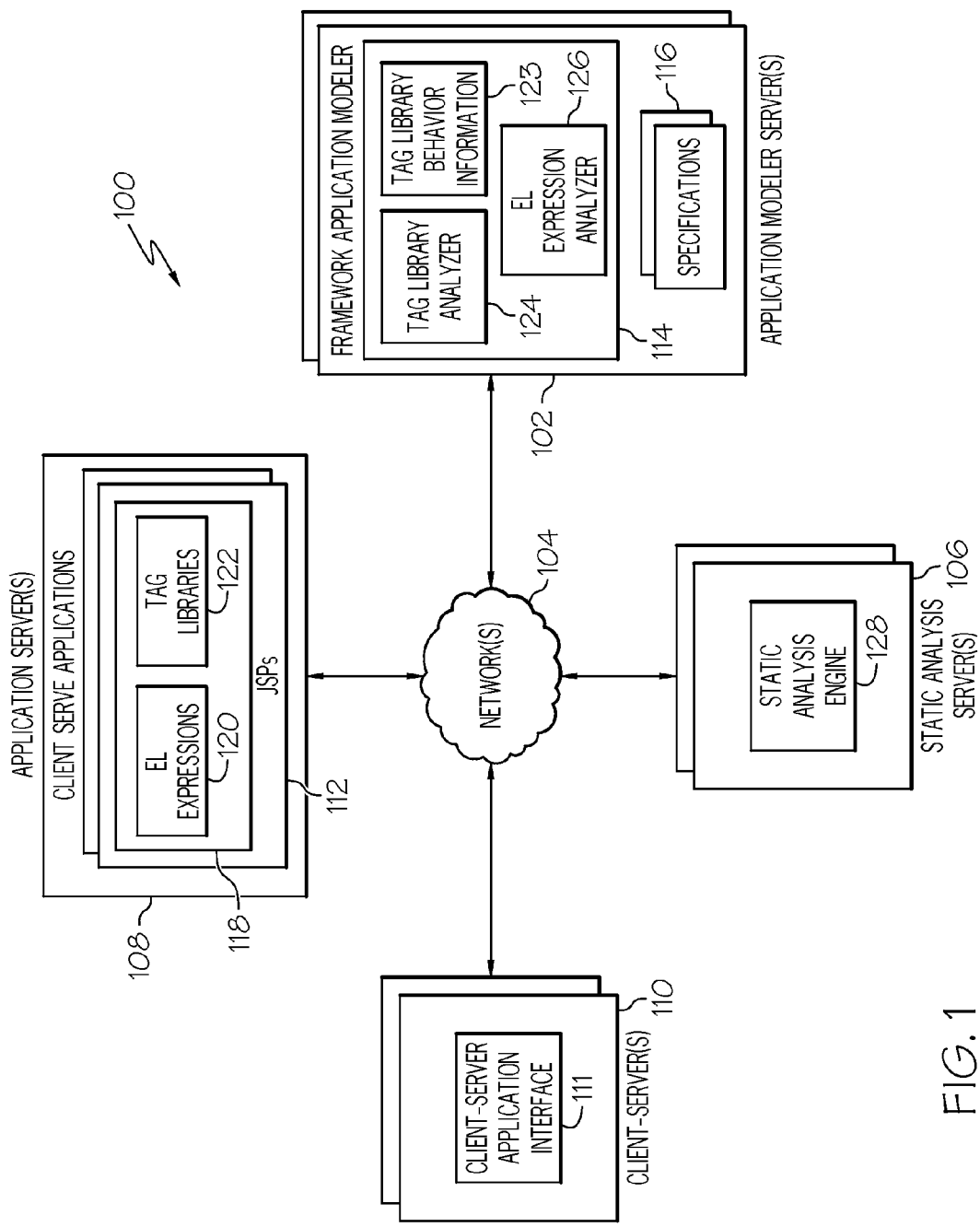
FIG. 1 is a block diagram illustrating an operating environment for one embodiment of the present invention.

FIG. 1 shows an exemplary operating environment for one embodiment of the present invention. This operating environment 100 can be a cloud computing environment, a non-cloud computing environment, or a combination of the two. The operating environment 100, in the illustrated embodiment, comprises one or more application modeler servers 102 communicatively coupled to one or more networks 104. One or more static analysis engine servers 106, one or more application servers 108, and one or more client systems 110 are also communicatively coupled to the network(s) 104. The network(s) 104, in this embodiment, comprises one or more types of networks, such as wide area networks, local area networks, and wireless networks.

The client system(s) 110 comprises a client-server application interface 111 (such as a web browser, a mashup, an application, or the like) for interacting with one or more client-server applications 112, such as a framework application (e.g., web application) residing at the application server(s) 108. The application modeler server(s) 102, in this embodiment, comprises a framework application modeler 114. The framework application modeler 114 generates specifications 116 (also referred to as "framework application models" or "web application specifications") describing the framework-based behaviors in client-server applications 112 such as web applications. A web application framework is a type of framework/foundation used to build web applications and provide core functionality that is common to many web applications. While "client-server applications" are sometimes referred to as "web applications" or "framework applications", client-server applications are not limited to only these types of applications.

The framework application modeler 114 generates specifications of EL expression and tag library usage within Java Server Pages (JSPs) 118 associated with web applications 112. A JSP 118 is a text-based document that comprises two types of text: static template data, which can be expressed in any text-based format (such as HTML, XML SVG, and WML); and JSP elements, which construct dynamic content. An EL expression 120 is a script that allows access to Java components, referred to as JavaBeans, through JSPs. Tag libraries 122 provide a platform independent way of extending the capabilities of a web server. For example, in JSPs, actions are elements that can create and access programming language objects and affect the output stream. In addition to the standard actions defined by the JSP specification, JSPs support the development of reusable modules referred to as custom actions. A custom action is invoked by using a custom tag in a JSP page. A tag library 122 is a collection of custom tags.

In one embodiment, the framework application modeler 114 performs a dataflow analysis for predefined tag library calls 122. This dataflow analysis propagates the name-binding behaviors of calls to these tag library calls to corresponding EL expressions 120. In this embodiment, the framework application modeler 114 comprises predefined tag library behavior information 123 of tag libraries 122. For example, the predefined tag library behavior information 123 can include information, such as instructions, that specifies how to compute the names and corresponding values created by a given tag library in terms of the tag library's attributes. The predefined tag library behavior information 123 can be obtained from tag library standards, authors of custom tag libraries, computed by the framework application modeler 114, or the like. The framework application modeler 114 generates specifications 116 that model uses of the tag libraries 122 without having to analyze their implementations. Therefore, more effective specifications can be generated (because it is very difficult to discover a tag library's behavior by analyzing its implementation) and better performance can be achieved (because the code of certain tag libraries need not be analyzed in full).

The framework application modeler 114 comprises a tag library flow analyzer 124 and an EL expression analyzer 126. These components are utilized by the framework application modeler 114 to generate specifications 116 of EL expression and tag library usage associated with pre-compiled JSPs 118. In further embodiments, one or more components of the framework application modeler 114 reside outside of the modeler 114 and/or across one or more other servers.

The static analysis engine server(s) 106, in this embodiment, comprises one or more static analysis engines 128. The static analysis engine 128 performs static code analysis operations. Static code analysis is the analysis of code fragments of an application without actually executing programs built from that code. The term applies to analysis performed by an automated tool, while human analysis is called program understanding, program comprehension, or code review. One example of a static analysis engine applicable to embodiments of the present invention is described in U.S. patent application Ser. No. 12/912,382, entitled "Static Analysis of Client-Server Applications Using Framework Independent Specifications", which is hereby incorporated by reference in its entirety.

Figure 2:
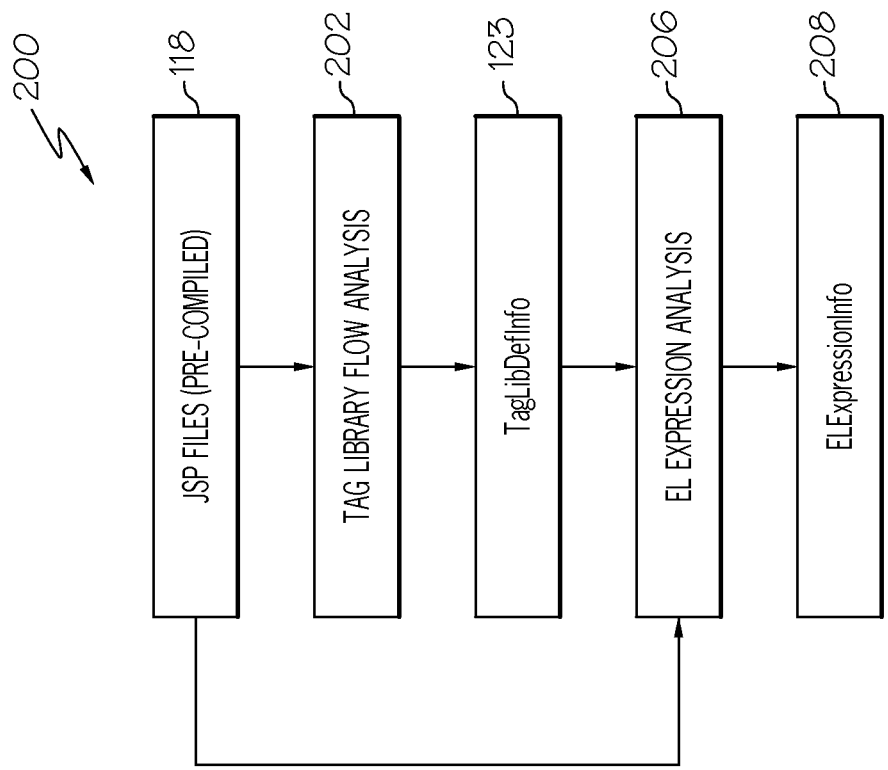
FIG. 2 illustrates a functional operational flow diagram for generating a specification of a web application modeling EL expression and tag library usage according to one embodiment of the present invention.

The following is a detailed discussion on how the framework application modeler and its components generate specifications modeling EL expression and tag library usage for web applications. FIG. 2 illustrates a functional operational flow diagram 200 for generating an EL expression and tag library usage specification of a web application according to one embodiment of the present invention. The tag library analyzer receives as an input one or more JSP files 118 for performing a tag library analysis process 202. The JSP file 118 comprises at least one call to a tag library 122 and at least one EL expression 120. In this embodiment, the JSP files 118 are passed through a JSP pre-complier prior to being received by the tag library analyzer 124. The pre-compiling process produces .java source files and .class bytecode files.

Figure 3:
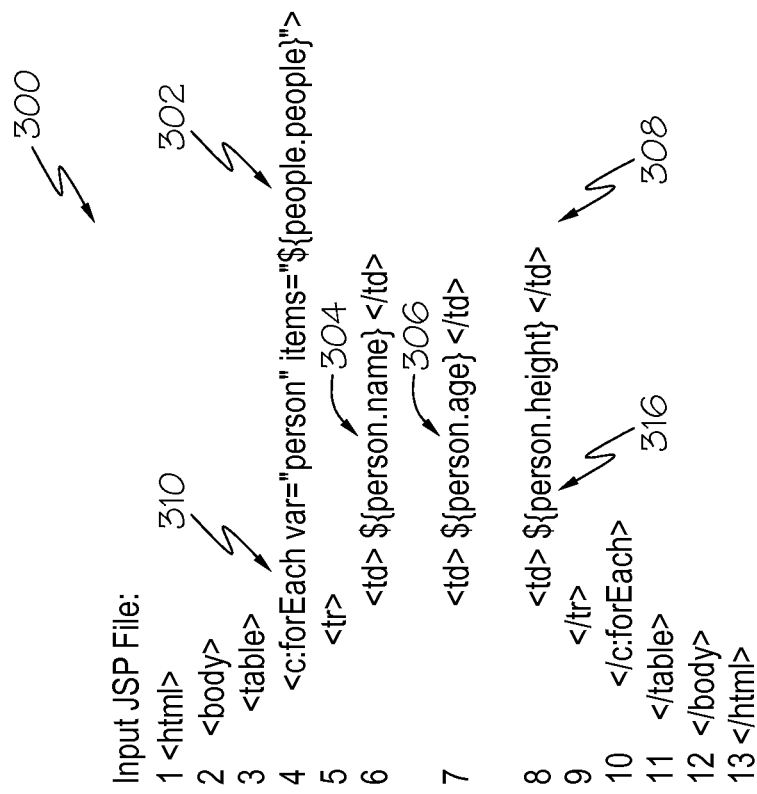
FIG. 3 shows exemplary source code for a JSP file of a web application in accordance with one embodiment of the present invention.

FIG. 3 shows one example of a JSP file 300 that can be received by the tag library analyzer 124 as an input. The EL expressions are enclosed within "${ }". For example, the JSP file 300 shown in FIG. 3 comprises a first EL expression 302, ${people,people}, a second EL expression 304, ${person.name}; a third EL expression 306, ${person.age}; and a fourth EL expression 308, ${person.height}. A detailed discussion on EL expressions can be found at download.oracle.com/javaee/1.4/tutorial/doc/JSPIntro7.html, which is hereby incorporated by reference in its entirety. The tag library usage of this JSP file 300 includes the references to the tag c:forEach 310. While the tag library analyzer 124 can receive a pre-compiled version of the JSP file as discussed above, for simplicity the JSP file itself is utilized in the illustrated example for discussion purposes.

In addition to the JSP file 118, the tag library analyzer 124 also receives the tag library behavior information 123 as an input. For example, with respect to the c:forEach 310 library call, the tag library behavior information 123 can comprise the following behavior information.

"c:forEach"→name=tag.var, value=tag.items+".iterator( ).next( )"

This shows the input information provided to handle the c:forEach library tag. This behavior information indicates that for each use of the c:forEach tag, the defined name is provided by the tag's "var" attribute, and the value associated with the name is computed by concatenating the tag's "items" attribute with the code ".iterator( ).next( )". The tag library analyzer 124 then performs a tag library flow analysis process 202 using the tag library behavior information 123. This analysis process 202 determines what variables/names and values are created by the tag libraries 122 that are relevant to EL expressions 120 within the JSP file 118, and the program points to which of the variables/names and values are applicable.

Note that the tag library calls within the precompiled version of the JSP file 118 can be treated as reaching definitions, where a reaching definition for a given instruction is another instruction, the target variable of which may reach the given instruction without an intervening assignment. For example, for the c:forEach tag 310, which is defined in the JavaServer Pages Standard Tag Library (JSTL), the call treated as a definition is its doStartTag( )method. In order to determine what names are bound by the calls to tag libraries 122 and the corresponding values, analysis of other tag library calls may be necessary. For example, for the c:forEach tag, as implemented by Apache Tomcat, the argument to its setVar( )method gives the name being bound, and the value passed to its setItems( )method can be used to determine the value of the introduced name. It should be noted that this information for the various methods is equivalent to that provided in the example tag library behavior information for c:forEach given above. The tag library flow analysis process 202 propagates the introduced names to control-flow successors of the tag library definition call. Also, multiple tag library calls can define the same name, in which case the later call (in the control flow) "kills" the definition introduced by the previous call. The modeling of this behavior necessitates performing the data flow analysis process (as opposed to just collecting names in a control-flow-insensitive manner).

Based on the above tag library flow analysis process 202, the tag library analyzer 124 creates a data structure 204 comprising tag library definition information. In particular, this data structure 204 stores a map from each program location to the set of tag-library-created names available at the program location. For example, with respect to the JSP file 300 shown in FIG. 2, the tag library flow analysis process 202 results in the tag library definition information 400 shown in FIG. 4. The tag library definition information 400 of FIG. 4 indicates that for lines 4 to 8 of the input JSP file 300, a tag library (e.g., The c:forEach tag library) has created/bound the name "person" to the expression ${people.people}.iterator( ).next( ) which yields the value bound to the name "person". This information is computed based on the tag library behavior information 123 for the c:forEach tag 310 discussed above.

For example, the name "person" is defined as "${people.people}.iterator( ).next( )", as shown in FIG. 4. The "people.people" portion of the "${people.people}.iterator( ).next( )" expression corresponds to the "items" portion of the c:forEach tag at line 4 of the JSP file 300. Therefore, when there is a c:forEach tag library call, the .iterator( ).next( )method is called on the "items" object resulting in the value that gets bound to the variable named in the .var attribute of the c:forEach tag, which is "person" in this example. The expression created by the tag library flow analysis process 202 can include both an EL expression and Java code, where the final representation for the EL expression is computed by the EL expression analyzer 126.

The data structure 204 is then passed to the EL expression analyzer 126, which then performs an EL expression analysis 206. The EL expression analysis identifies each EL expression within the JSP input file 118 and computes the possible values for each EL expression based on the information within the tag library definition information data structure 204 and also based on predefined default EL expression semantics. These EL expression semantics are defined in the JSP 2.0 specification, JSR-152, www.jcp.org/aboutJava/communityprocess/final/jsr152, which is hereby incorporated by reference in its entirety. In one embodiment, the possible values are determined by performing a hierarchical name lookup for the EL expression. First, if the EL expression refers to certain predefined special names (e.g., 'param', which enables access to request parameters), the appropriate value for the special name can be employed. Otherwise, if the EL expression references a name that was bound by a reaching tag library definition, the associated value from the definition is used. If neither of the previous cases holds, the analysis assumes that the EL expression is implicitly reading a request or session attribute.

For example, consider another example of an EL expression, ${product.price}. If the tag library definition information data structure 204 indicates that a tag library definition of 'product' as "request.getAttribute("prods").iterator( ).next( )" reaches the EL expression ${product.price}, the EL expression analyzer 126 determines the value of the EL expression to be "request.getAttribute("prods").iterator( ).next( ).getPrice( )" Otherwise, the EL expression analyzer 126 assumes that the EL expression reads a request or session attribute, yielding the possible values as "request.getAttribute("product").getPrice( )" or "session.getAttribute("product").getPrice( )".

Once the EL expression analyzer 126 has completed the EL expression analysis process 206 (or during the analysis process), the EL expression analyzer 126 generates an output data structure 208 comprising EL expression information. This data structure 204 stores a map from each EL expression in the input JSP file 118 to a set of Java expressions representing the possible values of the expression. These Java expressions can then be utilized by any static analysis engine 128 to perform static analysis operations.

Figure 5:
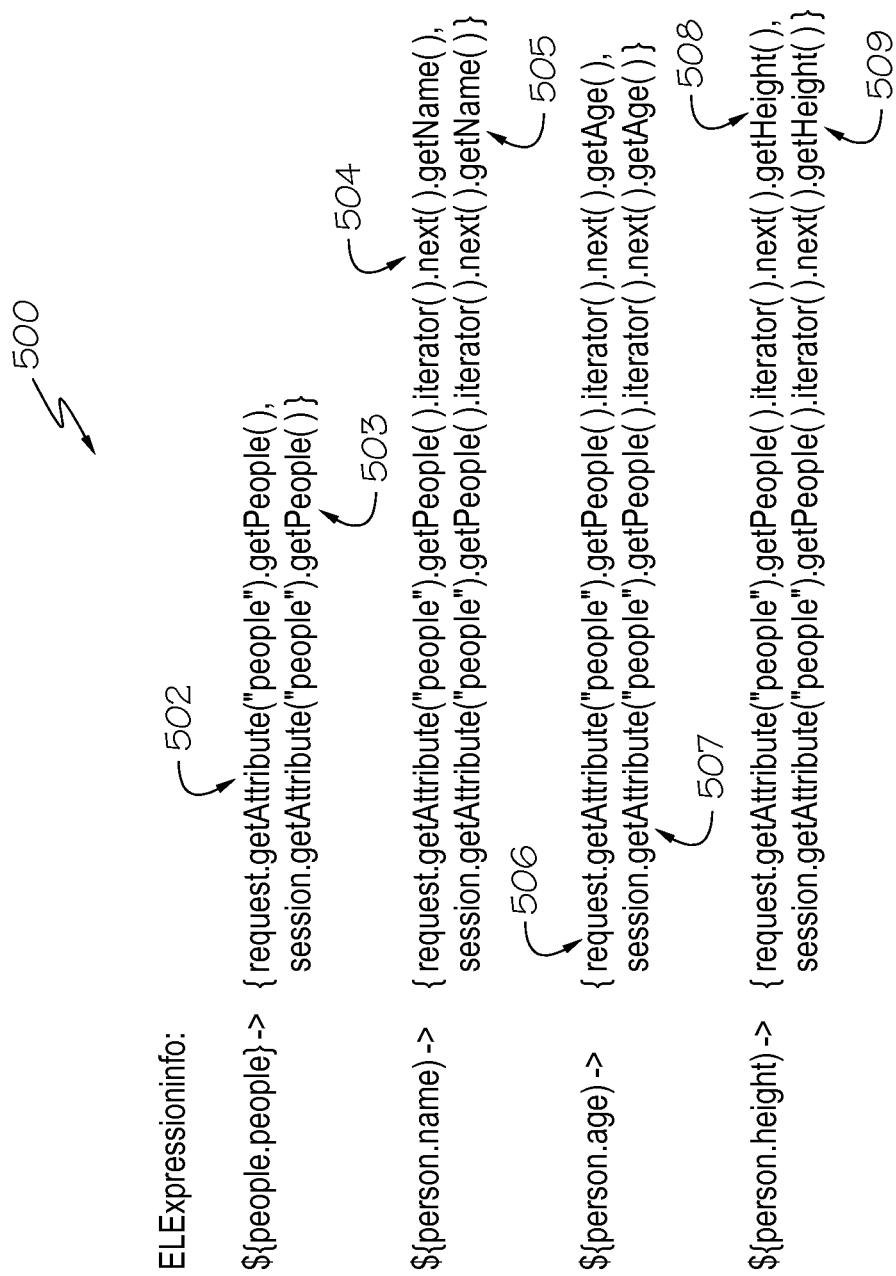
FIG. 5 shows exemplary EL expression information resulting from an EL expression analysis process in accordance with one embodiment of the present invention.

FIG. 5 shows one example of an EL expression information data structure 500 that is generated as a result of performing the EL expression analysis on the tag library information 400 shown in FIG. 4. As shown in FIG. 5, the EL expressions ${people.people} 302, ${person.name} 304, ${person.age} 304, and ${person.height} 308 from the JSP input file 300 are listed along with their Java expression(s) 502 to 509 computed by the EL analysis analyzer 126.

For example, FIG. 5 shows that the EL expression ${people.people} 302 has a Java expression of:
request.getAttribute("people").getPeople( ) 502,
session.getAttribute("people").getPeople( ) 503.
The EL expression ${person.name} 304 has a Java expression of:
request.getAttribute("people").getPeople( ).iterator( ).next( ).getName( ) 504,
session.getAttribute("people").getPeople( ).iterator( ).next( ).getName( ) 505.
The EL expression ${person.age} 306 has a Java expression of:
request.getAttribute("people").getPeople( ).iterator( ).next( ).getAge( ) 506, session.getAttribute("people").getPeople( ).iterator( ).next( ).getAge( ) 507.

The EL expression ${person.height} 308 has a Java expression of:

request.getAttribute("people").getPeople( ).iterator( ).next( ).getHeight( ) 508, session.getAttribute("people").getPeople( ).iterator( ).next( ).getHeight( ) 509.

The Java expression for ${people.people} 302 was computed by the EL expression analyzer 126 based on predefined behavior information of an EL expression engine for evaluating EL expression. The predefined behavior was used since the tag library definition information 204 shown in FIG. 4 does not comprise a definition associated with ${people.people} 302. As discussed above, this behavior information is defined in the JSP 2.0 specification, JSR-152. In this example, the predefined behavior is reading state from request attributes. Therefore, the EL expression analyzer 126 generates the Java expression of request.getAttribute("people").getPeople( ) for the ${people.people} EL expression, which indicates that an EL expression engine obtains a value for ${people.people} by calling request.getAttribute and passing in the string "people" to the .getPeople( )method. It should be noted that a corresponding Java expression with a "session.getAttribute( )" method instead of a "request.getAttribute( )" method can also be generated as well to cover the situation where the EL expression reads a session attribute.

The Java expressions for the subsequent EL expressions (${person.name}, etc.) were computed based both on predefined behavior information associated with an EL expression engine and also based on the information within the tag library information data structure 204, which indicates how the references to "person" should be resolved. For example, with respect to the ${person.name} EL expression 304, the EL expression analyzer 126 determines from the tag library information data structure 204 that "person" is defined as ${people.people}.iterator( ).next( ). As discussed above, the Java expression of request.getAttribute("people").getPeople( ) was created for ${people.people} by the EL expression analyzer 126. Therefore, the ${people.people} expression within ${people.people}.iterator( ).next( ) can be represented as "request.getAttribute("people").getPeople( )". In addition, because the expression ${person.name} comprises the ".name" object, the EL expression analyzer 126 also generates a call to "getName( )". Therefore, the Java expression generated for the ${person.name} EL expression is request.getAttribute("people").getPeople( ).iterator( ).next( ).getName( ) 504. A similar process is performed for the remaining EL expressions 306 and 308 yielding the Java expressions 506 and 508 shown in FIG. 5. It should be noted that for each EL expression a corresponding Java expression with a "session.getAttribute( )" method can also be generated as well similar to that discussed above.

The EL expression information 208 (e.g., the possible values of each EL expression) is then stored in a specification 116 of framework-related application behaviors. This specification 116 can then be utilized by one or more static analysis engines 128 for performing various analysis operations. One type of static analysis that can be performed is a security analysis operation for discovering security vulnerabilities in Java Enterprise Edition (JavaEE) applications. For example, assume that the JSP file 300 of FIG. 3 was part of a JavaEE application with the servlet class 600 shown in FIG. 6

Here, a Person object is constructed with tainted data (the result of a HttpServletRequest.getParameter( ) call) for its age, name, and height. The Person object is placed in a Collection, which is then stored in the "people" attribute of the request. If after this code executes, the exemplary JSP is used to render the response, a possible cross-site scripting vulnerability exists, as the tainted data is included directly in the response.

A conventional security static analysis would not discover this vulnerability based on code analysis alone, due to the use of EL expressions and tag libraries. However, with the information in the specification 116 resulting from the specification generating process discussed above with respect to FIGS. 2-5, the static analysis process gains a much more precise model of the EL expression behavior. This enables the discovery of the vulnerability. Embodiments of the present invention are not limited to a security vulnerability static analysis, but are also applicable to other types of static analysis.

Figure 7:
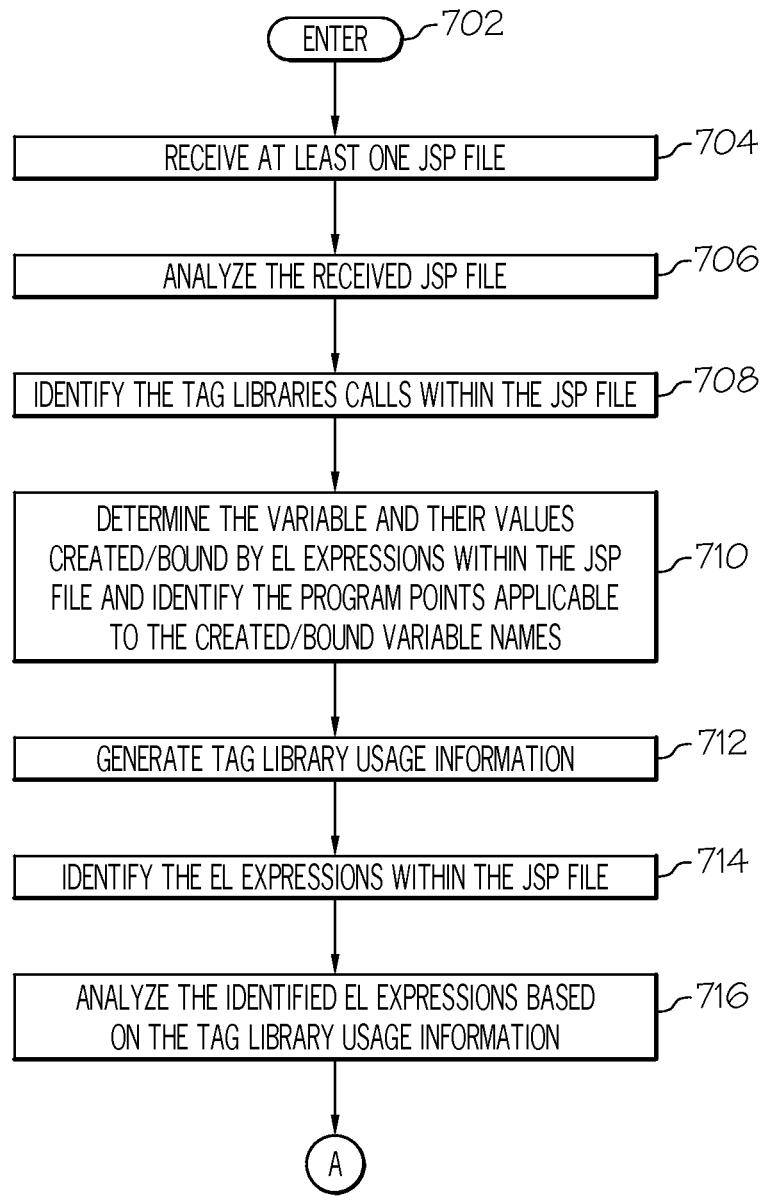
FIGS. 7 and 8 are operational flow diagrams for generating specifications for web applications modeling EL expression and tag library usage in accordance with one embodiment of the present invention.
Figure 8:
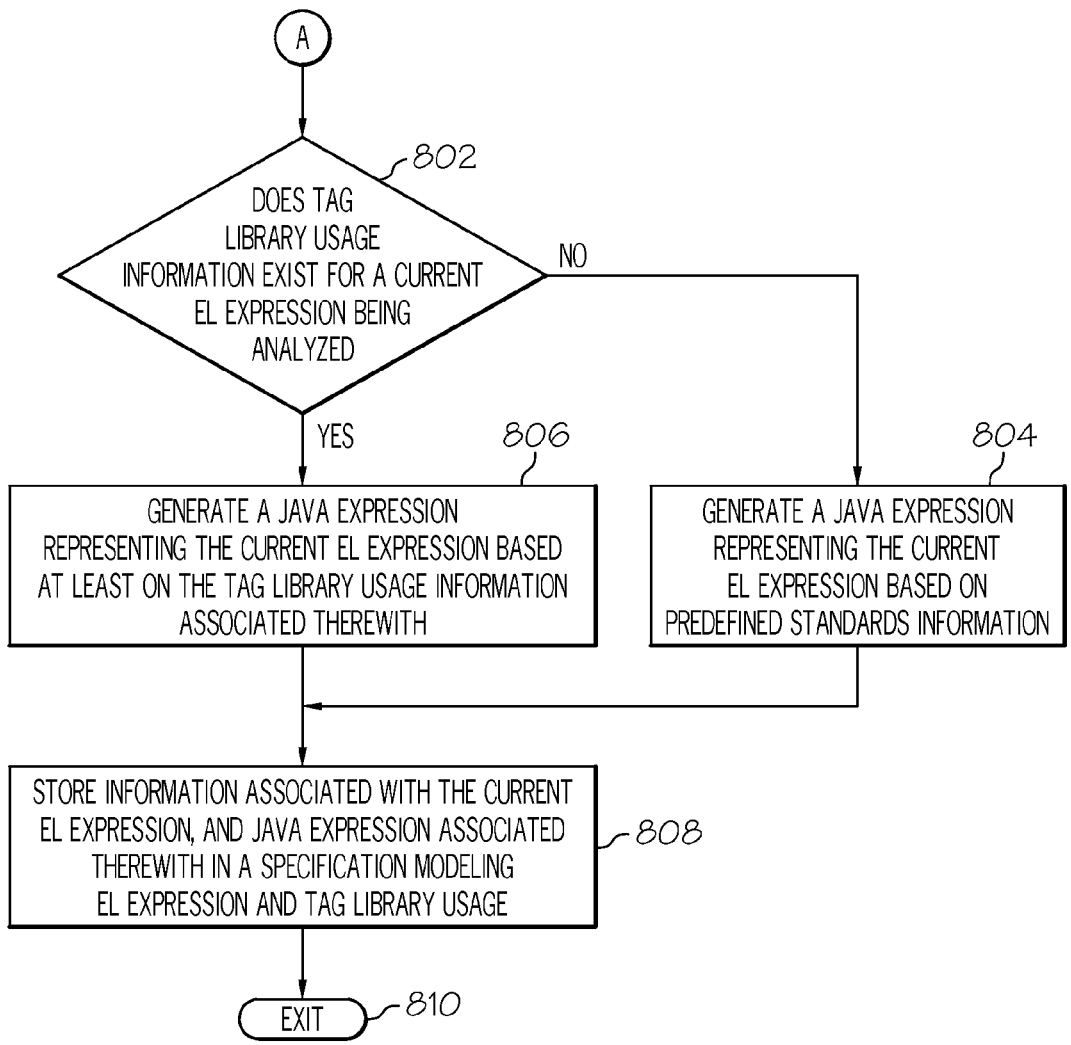

FIGS. 7 and 8 are operational flow diagrams for generating specifications modeling EL expression and tag library usage for web applications according to one embodiment of the present invention. The operational flow diagram of FIG. 7 begins at step 702 and flows directly to step 704. At least one JSP file 118 is received by the framework application modeler 114, at step 704. The framework application modeler 114 analyzes the received JSP file 118, at step 706. Based on this analysis, the framework application modeler 114 identifies the tag library calls within the JSP file 118, at step 708.

The framework application modeler 114 then determines the variable names, their values, and their applicable program points that are created/bound by each library tag call that are accessed by EL expressions 120 within the JSP file 118, at step 710. The framework application modeler 114 utilizes predefined tag library behavior information 123 in making this determination. Tag library usage information is then generated based on the variable names, their values, and their applicable program points, at step 712. The processes of steps 710 and 712 were discussed above with respect to FIGS. 2-4.

EL expressions within the JSP file 118 are identified by the framework application modeler 114, at step 714. The framework application modeler 114 then analyzes these EL expressions based on the tag library usage information, at step 716. The control then flows to entry point A of FIG. 8.

The framework application modeler 114 determines if tag library usage information exists for a given EL expression, at step 802. If the result of this determination is negative, the framework application modeler 114 generates a Java expression representing the given EL expression based on predefined standards information, at step 804, as discussed above. The control then flows to step 808. If the result of this determination is positive, the framework application modeler 114 generates a Java expression representing the given EL expression based at least on the tag library usage information associated therewith, at step 806. The framework application modeler 114 stores information associated with the given EL expression and also stores the generated Java Expression in a specification 116 that models EL expression and tag library usage, at step 808. The processes of steps 802 to 808 were discussed above with respect to FIGS. 2-5. The control flow exits at step 810.

Embodiments of the present invention can be implemented within a cloud computing environment. While the following is a detailed discussion on cloud computing, implementation of the teachings of the present invention are not limited to a cloud computing environment. Rather, embodiments of the present invention are capable of being implemented in conjunction with any type of computing environment now known or later developed. For example, embodiments of the present invention are applicable to a computing environment with a virtualized infrastructure or any other type of computing environment.

For convenience, this Detailed Description includes the definitions below that have been derived from "Draft NIST Working Definition of Cloud Computing," by Peter Mell and Tim Grance, dated Oct. 7, 2009, which is herein incorporated by reference. However, cloud computing environments that are applicable to one or more embodiments of the present invention are not required to correspond to the definitions and characteristics given below or in the "Draft NIST Working Definition of Cloud Computing" publication. The following definitions, characteristics, and discussions of cloud computing are given only as non-limiting examples.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows.

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows.

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
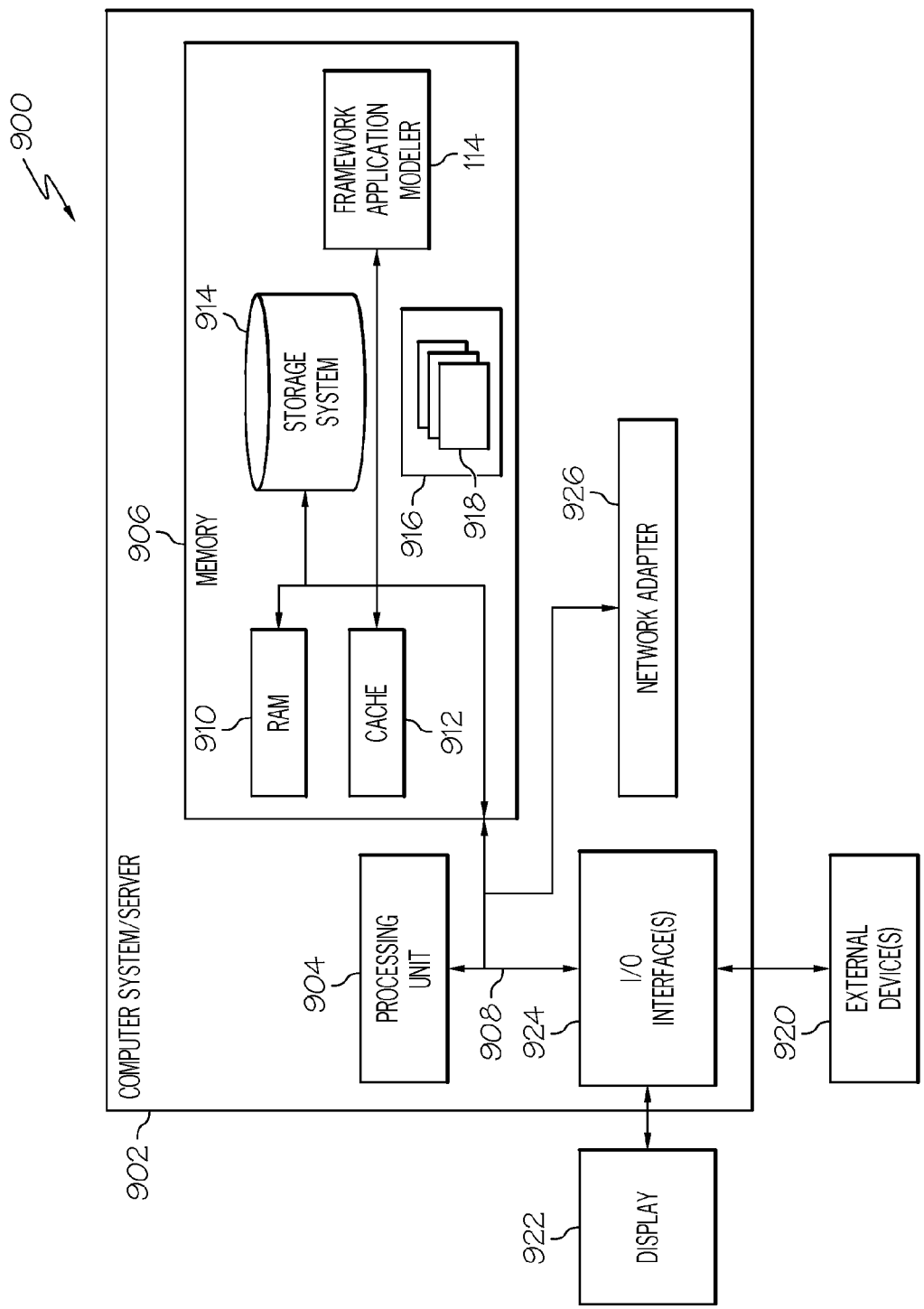
FIG. 9 illustrates a cloud computing node according to one embodiment of the present invention.

FIG. 9 shows a schematic of an exemplary cloud computing node. Cloud computing node 900 is only one example of a suitable cloud computing node and is not intended to suggest any limitation as to the scope of use or functionality of embodiments of the invention described herein. Regardless, cloud computing node 900 is capable of being implemented and/or performing any of the functionality set forth hereinabove.

In cloud computing node 900 there is a computer system/server 902, which is operational with numerous other general purpose or special purpose computing system environments or configurations. Examples of well-known computing systems, environments, and/or configurations that may be suitable for use with computer system/server 902 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 902 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 902 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, a computer system/server 902 (such as information processing system 102 in FIG. 1) in cloud computing node 900 is shown in the form of a general-purpose computing device. It should be noted that this system 902 is not required to reside within a cloud computing environment and can reside in a non-cloud computing environment as well. The components of computer system/server 902 may include, but are not limited to, one or more processors or processing units 904, a system memory 906, and a bus 908 that couples various system components including system memory 906 to processor 904.

Bus 908 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 902 typically includes a variety of computer system readable media. Such media may be any available media that is accessible by computer system/server 902, and it includes both volatile and non-volatile media, removable and non-removable media.

System memory 906, in one embodiment, comprises the framework application modeler 114 and its components, as described above. These components can also be implemented in hardware as well. The system memory 906 can include computer system readable media in the form of volatile memory, such as random access memory (RAM) 910 and/or cache memory 912. Computer system/server 902 may further include other removable/non-removable, volatile/non-volatile computer system storage media. By way of example only, storage system 914 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 908 by one or more data media interfaces. As will be further depicted and described below, memory 906 may include at least one program product having a set (e.g., at least one) of program modules that are configured to carry out the functions of embodiments of the invention.

Program/utility 916, having a set (at least one) of program modules 918, may be stored in memory 906 by way of example, and not limitation, as well as an operating system, one or more application programs, other program modules, and program data. Each of the operating system, one or more application programs, other program modules, and program data or some combination thereof, may include an implementation of a networking environment. Program modules 918 generally carry out the functions and/or methodologies of embodiments of the invention as described herein.

Computer system/server 902 may also communicate with one or more external devices 920 such as a keyboard, a pointing device, a display 922, etc.; one or more devices that enable a user to interact with computer system/server 902; and/or any devices (e.g., network card, modem, etc.) that enable computer system/server 902 to communicate with one or more other computing devices. Such communication can occur via I/O interfaces 924. Still yet, computer system/server 902 can communicate with one or more networks such as a local area network (LAN), a general wide area network (WAN), and/or a public network (e.g., the Internet) via network adapter 926. As depicted, network adapter 926 communicates with the other components of computer system/server 902 via bus 908. It should be understood that although not shown, other hardware and/or software components could be used in conjunction with computer system/server 902. Examples, include, but are not limited to: microcode, device drivers, redundant processing units, external disk drive arrays, RAID systems, tape drives, and data archival storage systems, etc.

Figure 10:
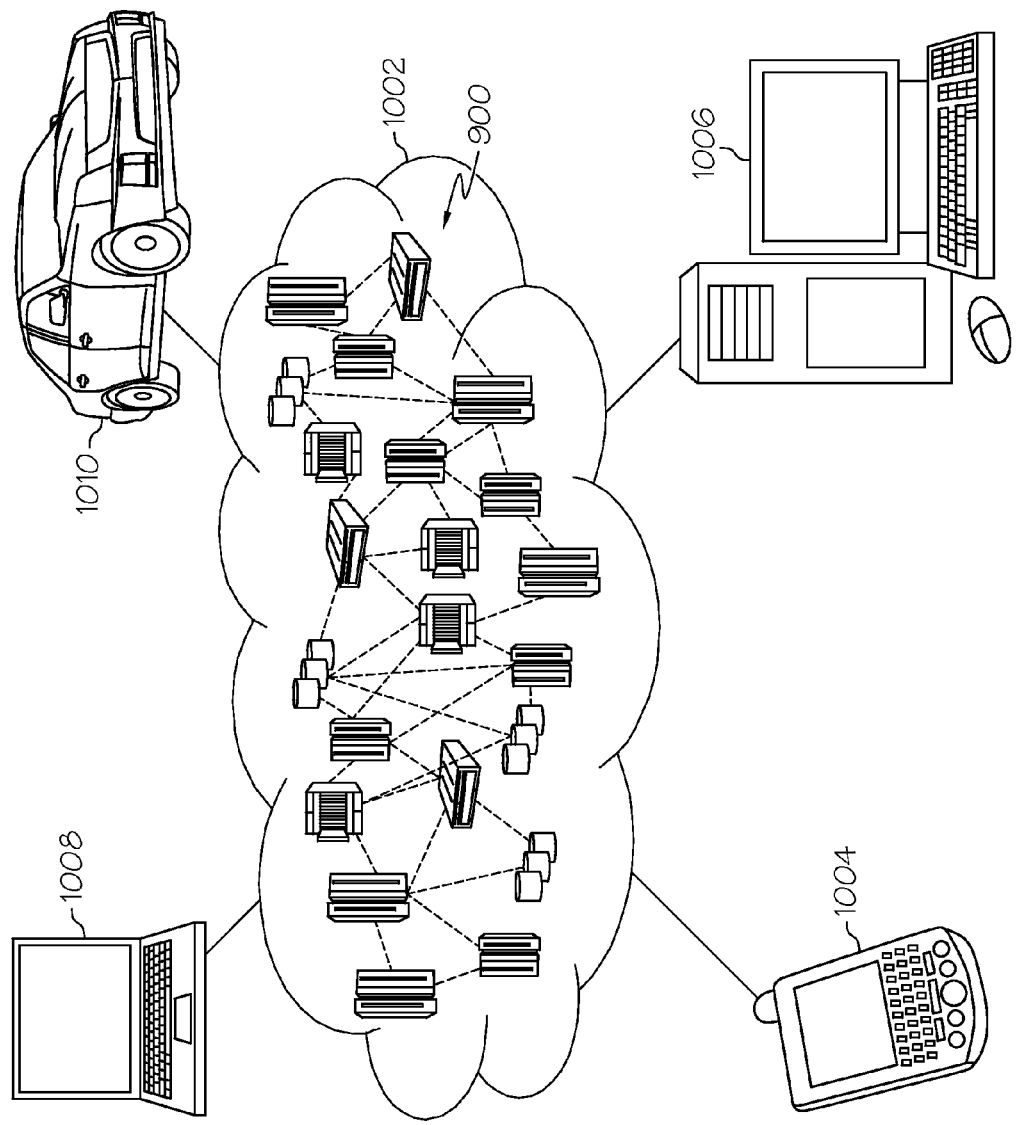
FIG. 10 illustrates a cloud computing environment according to one embodiment of the present invention.

FIG. 10 depicts an illustrative cloud computing environment. As shown, the cloud computing environment 1002 comprises one or more cloud computing nodes 900 with which local computing devices used by cloud consumers, such as, for example, personal digital assistant (PDA) or cellular telephone 1004, desktop computer 1006, laptop computer 1008, and/or automobile computer system 1010 may communicate. Nodes 900 may communicate with one another. They may be grouped (not shown) physically or virtually, in one or more networks, such as Private, Community, Public, or Hybrid clouds as described hereinabove, or a combination thereof. This allows cloud computing environment 1002 to offer infrastructure, platforms and/or software as services for which a cloud consumer does not need to maintain resources on a local computing device. It is understood that the types of computing devices 1004, 1006, 1008, 1010 shown in FIG. 10 are intended to be illustrative only and that computing nodes 900 and cloud computing environment 1002 can communicate with any type of computerized device over any type of network and/or network addressable connection (e.g., using a web browser).

Figure 11:
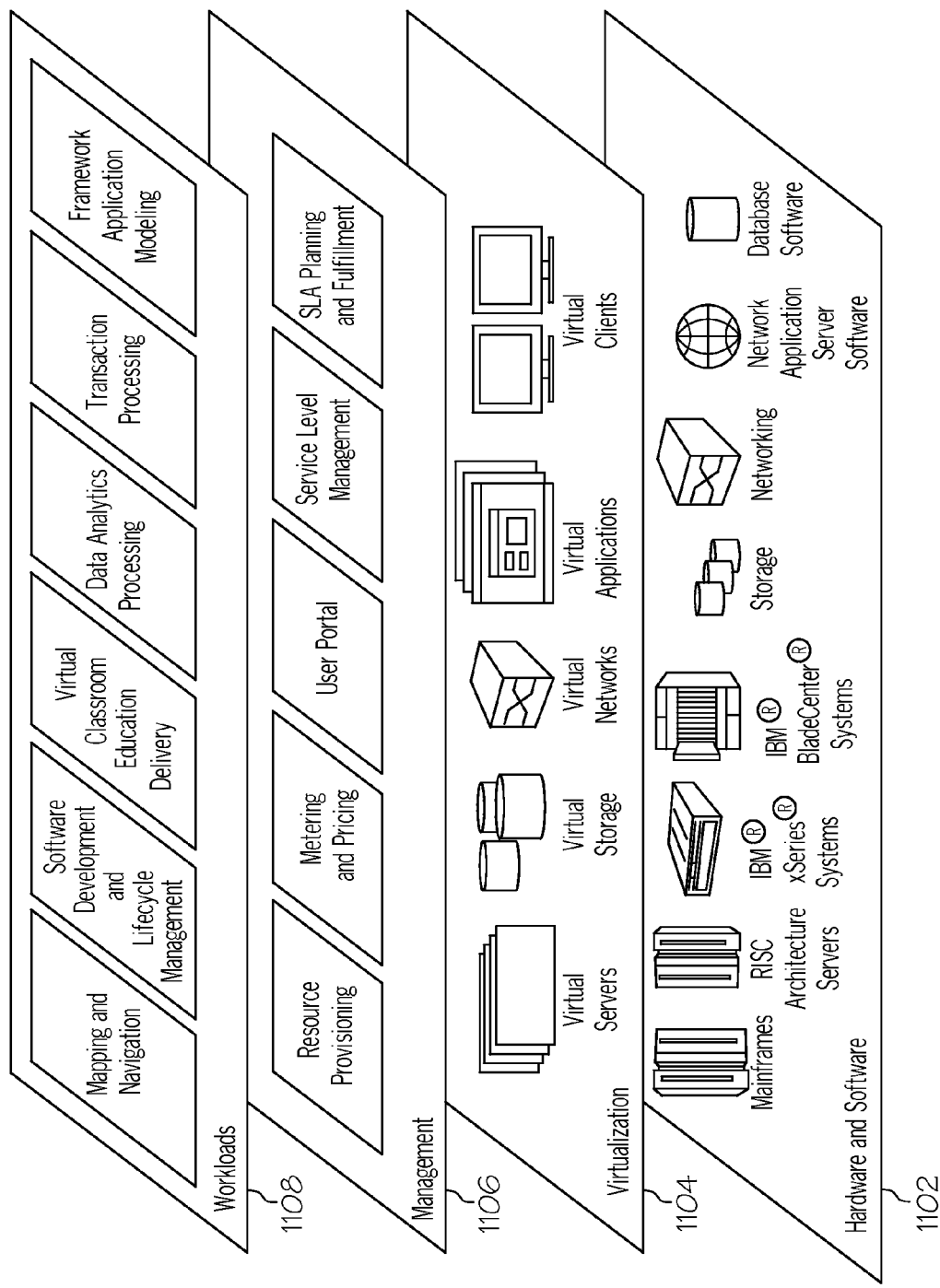
FIG. 11 illustrates abstraction model layers according to one embodiment of the present invention.

FIG. 11 shows a set of functional abstraction layers provided by cloud computing environment. The components, layers, and functions shown in FIG. 11 are intended to be illustrative only and embodiments of the invention are not limited thereto. As depicted, the following layers and corresponding functions are provided.

Hardware and software layer 1102 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 1104 provides an abstraction layer from which the following examples of virtual entities may be provided: virtual servers; virtual storage; virtual networks, including virtual private networks; virtual applications and operating systems; and virtual clients.

In one example, management layer 1106 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1108 provides examples of functionality for which the cloud computing environment may be utilized. Examples of workloads and functions which may be provided from this layer include: mapping and navigation; software development and lifecycle management; virtual classroom education delivery; data analytics processing; transaction processing; and framework application modeling.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been discussed above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments above were chosen and described in order to best explain the principles of the invention and the practical application, and to enable others of ordinary skill in the art to understand the invention for various embodiments with various modifications as are suited to the particular use contemplated.

What is claimed is:

1. A method for creating a data structure for a software application that is based on at least one framework, the method comprising:
    analyzing, by a framework application modeler prior to executing the software application, at least one Java Server Page file associated with the software application, the Java Server Page file comprising at least one call to at least one library tag, and at least one Expression Language (EL) expression;
    generating, based on the analyzing and prior to executing the software application, a first data structure comprising a set of tag library usage information for the Java Server Page file, the set of tag library usage information comprising
        a set of variable names bound by the at least one call to the at least one library tag,
        a set of values for each of the set of variable names, and
        a set of program points within the Java Server Page file where the at least one EL expression accesses each of the set of variable names,
    the first data structure further comprising a map from each of the set of program points to each of the set of variable names available at each of the set of program points;
    evaluating, after generating the first data structure and prior to executing the software application, the at least one EL expression based on at least one of the variable names in the set of variable names and at least one value in the set of values associated with the at least one of the variable names, the evaluating comprising at least computing a set of possible values for the at least one EL expression; and
    creating, prior to executing the software application, a second data structure for a static analysis engine based on the at least one EL expression that has been evaluated, the second data structure comprising a set of Java expressions representing the set of possible values of the at least one EL expression.

2. The method of claim 1, wherein the at least one Java Server Page file is a precompiled Java Server Page file.

3. The method of claim 1, wherein generating the set of tag library usage information comprises accessing a set of tag library behavior information associated with the at least one tag library, the set of tag library behavior information comprising a set of instructions indicating how to compute the set of variable names and the set of values for each of the set of variable names in terms of attributes of the tag libraries.

4. The method of claim 1, wherein evaluating the at least one EL expression comprises generating the at least one Java expression based on the set of tag library usage information and the map.

5. The method of claim 4, wherein evaluating the at least one EL expression comprises:
    analyzing the set of tag library usage information;
    identifying, based on the analyzing, one or more program points in the set of program points associated with the at least one EL expression;
    identifying, based on the map, at least one variable name in set of variable names accessed by the at least one EL expression at the one or more program points; and
    generating, based on identifying the at least one variable name, the Java expression based on the at least one variable and the set of values of the at least one variable name, the Java expression comprising at least a Java method call for obtaining the set of values of the at least one variable name.

6. An information processing system for creating a data structure for a software application that is based on at least one framework, the information processing system comprising:
    a memory;
    a processor communicatively coupled to the memory; and
    a framework application modeler communicatively coupled to the memory and the processor, the framework application modeler configured to perform a method comprising:
        analyzing, prior to executing the software application, at least one Java Server Page file associated with the software application, the Java Server Page file comprising at least one call to at least one library tag, and at least one Expression Language (EL) expression;
        generating, based on the analyzing and prior to executing the software application, a first data structure comprising a set of tag library usage information for the Java Server Page file, the set of tag library usage information comprising
            a set of variable names bound by the at least one call to the at least one library tag,
            a set of values for each of the set of variable names, and
            a set of program points within the Java Server Page file where the at least one EL expression accesses each of the set of variable names,
        the first data structure further comprising a map from each of the set of program points to each of the set of variable names available at each of the set of program points;
        evaluating, after generating the first data structure and prior to executing the software application, the at least one EL expression based at least one of the variable names in the set of variable names and at least one value in the set of values associated with the at least one of the variable names, the evaluating comprising at least computing a set of possible values for the at least one EL expression; and
        creating, prior to executing the software application, a second data structure for a static analysis engine based on the at least one EL expression that has been evaluated, the second data structure comprising a set of Java expressions representing the set of possible values of the at least one EL expression.

7. The information processing system of claim 6, wherein generating the set of tag library usage information comprises accessing a set of tag library behavior information associated with the at least one tag library, the set of tag library behavior information comprising a set of instructions indicating how to compute the set of variable names and the set of values for each of the set of variable names in terms of attributes of the tag libraries.

8. The information processing system of claim 6, wherein evaluating the at least one EL expression comprises generating the at least one Java expression based on the set of tag library usage information and the map.

9. The information processing system of claim 8, wherein evaluating the at least one EL expression comprises:
   analyzing the set of tag library usage information;
   identifying, based on the analyzing, one or more program points in the set of program points associated with the at least one EL expression;
   identifying, based on the map, at least one variable name in set of variable names accessed by the at least one EL expression at the one or more program points; and
   generating, based on identifying the at least one variable name, the Java expression based on the at least one variable and the set of values of the at least one variable name, the Java expression comprising at least a Java method call for obtaining the set of values of the at least one variable name.

10. A non-transitory machine readable medium encoded with a program for creating a data structure associated with a software application that is based on at least one framework, the program comprising instructions for:
   analyzing, by a framework application modeler prior to executing the software application, at least one Java Server Page file associated with the software application, the Java Server Page file comprising at least one call to at least one library tag, and at least one Expression Language (EL) expression;
   generating, based on the analyzing and prior to executing the software application, a first data structure comprising a set of tag library usage information for the Java Server Page file, the set of tag library usage information comprising
      a set of variable names bound by the at least one call to the at least one library tag,
      a set of values for each of the set of variable names, and
      a set of program points within the Java Server Page file where the at least one EL expression accesses each of the set of variable names,
   the first data structure further comprising a map from each of the set of program points to each of the set of variable names available at each of the set of program points;
   evaluating, after generating the first data structure and prior to executing the software application, the at least one EL expression based on at least one of the variable names in the set of variable names and at least one value in the set of values associated with the at least one of the variable names, the evaluating comprising at least computing a set of possible values for the at least one EL expression; and
   creating, prior to executing the software application, a second data structure for a static analysis engine based on the at least one EL expression that has been evaluated, the second data structure comprising a set of Java expressions representing the set of possible values of the at least one EL expression.

11. The non-transitory machine readable medium of claim 10, wherein the at least one Java Server Page file is a precompiled Java Server Page file.

12. The non-transitory machine readable medium of claim 10, wherein generating the set of tag library usage information comprises accessing a set of tag library behavior information associated with the at least one tag library, the set of tag library behavior information comprising a set of instructions indicating how to compute the set of variable names and the set of values for each of the set of variable names in terms of attributes of the tag libraries.

13. The non-transitory machine readable medium of claim 10, wherein evaluating the at least one EL expression comprises generating the at least one Java expression based on the set of tag library usage information and the map.

14. The non-transitory machine readable medium of claim 13, wherein evaluating the at least one EL expression comprises:
   analyzing the set of tag library usage information;
   identifying, based on the analyzing, one or more program points in the set of program points associated with the at least one EL expression;
   identifying, based on the map, at least one variable name in set of variable names accessed by the at least one EL expression at the one or more program points; and
   generating, based on identifying the at least one variable name, the Java expression based on the at least one variable and the set of values of the at least one variable name, the Java expression comprising at least a Java method call for obtaining the set of values of the at least one variable name.

* * * * *